W. F. PURCELL.
PACKING FOR FLUID ENGINES.
APPLICATION FILED MAY 1, 1908.
973,972.
Patented Oct. 25, 1910.
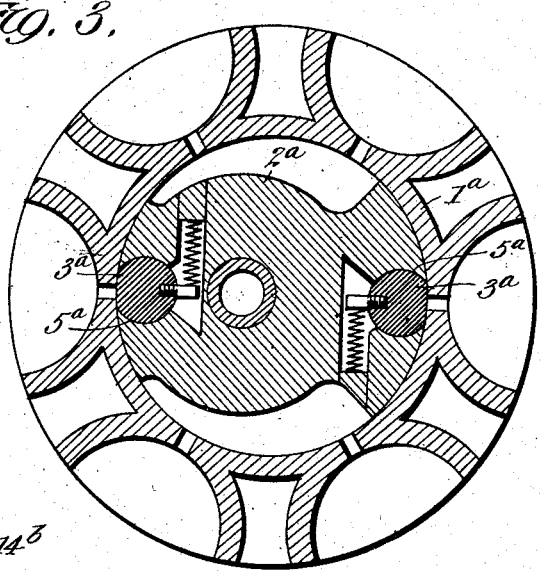
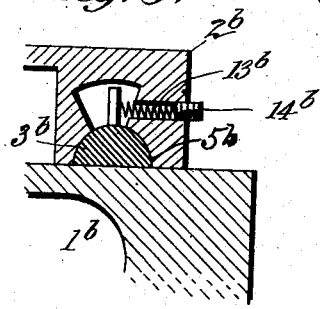
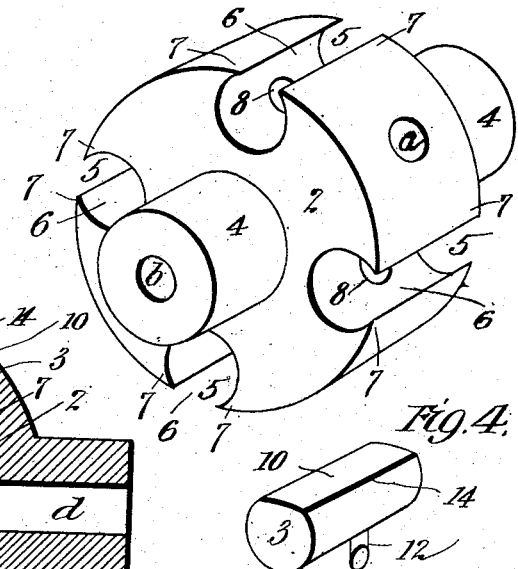
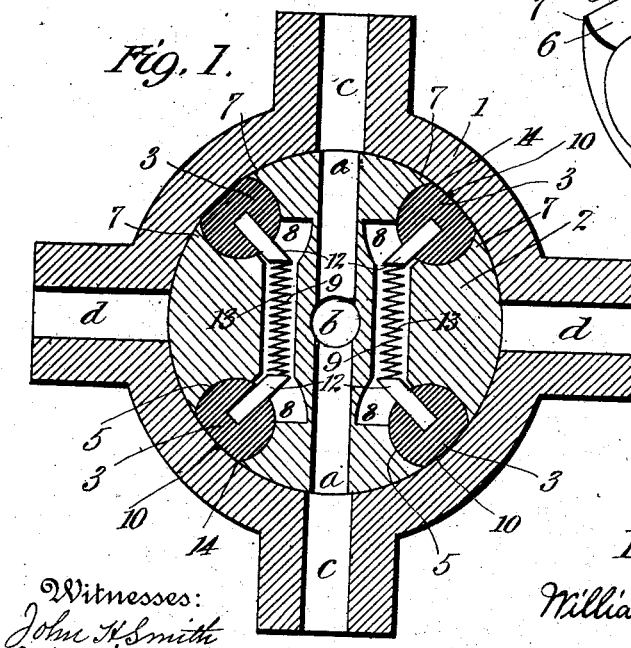
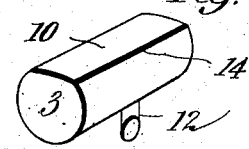
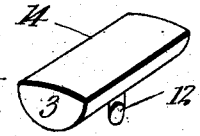
Witnesses:
John K. Smith
John J. Aylward
William F. Purcell, Inventor

UNITED STATES PATENT OFFICE.

WILLIAM F. PURCELL, OF BROOKLYN, NEW YORK.

PACKING FOR FLUID-ENGINES.

973,972.  Specification of Letters Patent.  Patented Oct. 25, 1910.

Application filed May 1, 1908. Serial No. 430,356.

*To all whom it may concern:*

Be it known that I, WILLIAM F. PURCELL, citizen of the United States, and resident of the borough of Brooklyn, in the county of Kings and State of New York, have invented certain new and useful Improvements in Packing for Fluid-Engines, of which the following is a specification.

This invention relates to packing for fluid driven or fluid controlling machines, and its object is to provide an automatically-adjustable means to compensate for wear and to maintain fluid-tight joints between relatively movable parts.

A further object of the invention is to provide a packing, which, when applied to parts intended to be rotated at high speed, will embody a provision whereby the effect of centrifugal force will be taken up by the part in which the packing is mounted, and so obviate the harmful effect of an undue pressure in its frictional contact with contiguous parts.

The invention consists of a packing member adapted to seal between relatively moving bodies and a means whereby an axial movement imparted to said packing member will cause it to establish a more perfect seal. It further consists in certain structural features of the mounting for said packing member whereby, when the latter is carried by a high-speed rotary part, it will be restrained from radial movement with respect to the axis of said part.

In the accompanying drawing, Figure 1 is a sectional representation of a rotary valve to which my invention is applied; Fig. 2 is a perspective view of the rotating member of Fig. 1, detached; Fig. 3 is a sectional representation of the piston and casing of a certain type of rotary motor; Fig. 4 is a detail view of a packing member; Fig. 5 is a similar view of a slightly modified form of packing member; and Fig. 6 is a sectional view illustrating the application of my invention to a reciprocating valve.

Referring to the drawings in which similar reference characters denote corresponding parts throughout the several figures, 1, is a casing, 2, a movable body inclosed therein, and 3, packing members carried by said movable body and adapted to move in frictional engagement with the wall of the casing.

In Fig. 1 the movable body 2, is provided with radial ports $a$, $a$, which communicate with the axial bore $b$, in the shaft 4, the latter being connected with a suitable source of fluid supply, not shown. The casing is provided with four radial ports $c$, $c$, and $d$, $d$, which are alternately brought into alinement with the ports $a$, $a$, when the body 2 is rotated.

It is intended that the body 2 be rotated at a high speed, and in order to establish a fluid-tight joint between it and the surrounding wall of the casing 1, and at the same time avoid undue friction between the packing and the casing I provide the following: The body 2 is provided with a number of grooves 5, extending longitudinally from end to end thereof, (Fig. 2) the center of each groove being located at a distance from the periphery of said body less than half the diameter of the groove, so that the wall of the groove will be intersected by the periphery of the body 2, leaving an approximately cylindrical seat or cradle with an open mouth 6, and overhanging edges 7. There are four of these grooves, but obviously there may be more or fewer as desired.

At the bottom of each groove 5, there is a small chamber 8, and each pair of such chambers is connected together by a passage 9, the purpose of which will presently appear.

The packing members (Figs. 4 and 5) are preferably integral bodies of suitable packing material, corresponding in length and cross-section to the grooves 5, into which they are fitted; the relatively flattened portion 10 of each packing member lying between the overhanging edges 7, of its respective groove.

12 denote lugs or pins projecting from the packing members 3, in radial direction, and entering chambers 8, where they are engaged by springs 13. In Fig. 1, one spring serves for two packing members, said spring occupying the passage 9, before referred to, and exerting a constant pressure against the lugs 12, which tends to tilt the packing member and so force one of the corners 14, thereof, against the inner surface of the casing 1. In this manner the results of wear are automatically compensated for and a tight seal preserved,—not, it should be noted, by moving the packing member bodily toward the casing, but by changing the angular relation of the flattened surface 10, of said member to the interior surface of the casing, while said member as a whole retains its original position, and is restrained from radial movement both outwardly and inwardly.

In Fig. 3, 1ª, and 2ª, denote the casing and piston respectively of a rotary engine or pump of a type in which both said piston and said casing are movable. Such an engine is fully described and illustrated in U. S. Patent to Smith and Purcell, No. 883,430, March 31, 1908, and needs no further description herein. In this case the piston 2ª is provided with longitudinal grooves 5ª, similar to those described in reference to Fig. 1, and receive similarly constructed and similarly operating spring-pressed packing members 3ª.

In the case of sliding or reciprocating parts as indicated in Fig. 6, or in low-speed rotary engines or the like, where there is little or no centrifugal action tending to bind the packing against the interior wall of the casing, the overhanging edges 7, are unnecessary.

In Fig. 6, 1ᵇ, is a stationary part of a valve mechanism, 2ᵇ, a sliding or reciprocating valve, and 3ᵇ, the packing member, which is an approximately semi-cylindrical body fitted into an approximately semi-cylindrical groove 5ᵇ. The spring 13ᵇ, in this case is provided with an adjusting screw 14ᵇ, whereby the tension of the spring may be regulated.

Fig. 5 illustrates the form of packing which might be used in lieu of that shown in Fig. 3 in case the engine were intended to be run at a low speed.

The operation of the invention in view of the foregoing is obvious, and it is believed that many of the advantages of the same are also obvious, but I wish to call attention to one distinct advantage, and that is that no reasonable amount of wear that the packing may be subjected to can possibly affect its efficiency. Owing to its peculiar mounting it is as good when much worn as when new, is always held up to its work and always backed up by its support. It can never rattle or hammer in its mounting or become displaced.

I claim as my invention:

1. In a machine of the character described, the combination of two bodies, one of them being movable, a cylindrical packing member adapted to form a seal between said bodies, and cradled in one of them, means for tilting said packing member, and means for restraining the movement of the same in other directions.

2. In a machine of the character described, the combination of a movable and a stationary body, a cylindrical packing member carried by the movable body, said member having a flattened side which is adapted to contact with a surface of the stationary body, and means for changing the angular relation of the said flattened side to the said surface.

Signed at No. 144 Sixth avenue New York city in the county of New York and State of New York this 29th day of April A. D. 1908.

WILLIAM F. PURCELL.

Witnesses:
 Jos. Isaacs,
 John H. Smith.